(12) United States Patent
Giambiagi et al.

(10) Patent No.: US 9,430,662 B2
(45) Date of Patent: *Aug. 30, 2016

(54) PROVISIONING AUTHORIZATION CLAIMS USING ATTRIBUTE-BASED ACCESS-CONTROL POLICIES

(71) Applicant: AXIOMATICS AB, Stockholm (SE)

(72) Inventors: Pablo Giambiagi, Stockholm (SE); Peter Piotr Karpinski, Stockholm (SE)

(73) Assignee: AXIOMATICS AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,212

(22) Filed: Dec. 15, 2014

(65) Prior Publication Data
US 2015/0101014 A1 Apr. 9, 2015

Related U.S. Application Data

(63) Continuation of application No. 13/777,735, filed on Feb. 26, 2013, now Pat. No. 8,955,040.

(60) Provisional application No. 61/603,648, filed on Feb. 27, 2012.

(51) Int. Cl.
G06F 21/62 (2013.01)
G06F 21/60 (2013.01)
G06F 21/00 (2013.01)
G06F 21/31 (2013.01)
H04L 29/06 (2006.01)
H04L 9/00 (2006.01)
H04N 19/42 (2014.01)

(52) U.S. Cl.
CPC .............. *G06F 21/62* (2013.01); *G06F 21/00* (2013.01); *G06F 21/31* (2013.01); *G06F 21/604* (2013.01); *H04L 9/00* (2013.01); *H04L 29/06* (2013.01); *H04N 19/42* (2014.11)

(58) Field of Classification Search
USPC .............................................. 726/1
See application file for complete search history.

(56) References Cited

U.S. PATENT DOCUMENTS

| 8,332,359 | B2 | 12/2012 | Kreuch et al. | |
| 8,543,606 | B2 | 9/2013 | Pulfer et al. | |
| 8,667,556 | B2 | 3/2014 | Chang et al. | |
| 2007/0056019 | A1 | 3/2007 | Allen et al. | |
| 2009/0288135 | A1* | 11/2009 | Chang | H04L 63/20 726/1 |
| 2009/0288136 | A1* | 11/2009 | Chang | G06F 21/6218 726/1 |
| 2010/0257579 | A1 | 10/2010 | Karjoth et al. | |

* cited by examiner

Primary Examiner — Jeffrey Pwu
Assistant Examiner — Samuel Ambaye
(74) Attorney, Agent, or Firm — Barnes & Thornburg LLP

(57) ABSTRACT

Disclosed are methods and devices for provisioning authorization claims, which are enforced to control access of users to objects (resources) in a computer system, and which are to be equivalent to an attribute-based access control (ABAC) policy. A policy converter according to the invention includes a policy processor processing the policy by partial evaluation against attribute values of the users, objects or permission levels in the system and outputting simplified policies, which are subject to reverse evaluation in a reverse policy evaluator, whereby users, objects and permission levels to be associated by way of a single authorization claim are obtained. Responsible for the defining of the authorization claim and its distribution in the computer system are an authorization claim generator and an authorization claim distribution interface. The invention may be so configured as to return a single authorization claim for each combination of an object and a permission level.

16 Claims, 3 Drawing Sheets

PROVISIONING AUTHORIZATION CLAIMS USING ATTRIBUTE-BASED ACCESS-CONTROL POLICIES

CROSS REFERENCE TO RELATED APPLICATIONS

This application is a Continuation of copending patent application Ser. No. 13/777,735, filed Feb. 26, 2013, which claims the benefit of priority under 35 U.S.C. §119(e) to U.S. Provisional Patent Application No. 61/603,648, filed Feb. 27, 2012. The disclosures set forth in the referenced applications are incorporated herein by reference in their entireties.

BACKGROUND OF THE INVENTION

The invention disclosed herein generally relates to the field of access control (AC) in computer systems. In particular, it provides devices and methods useful for provisioning authorization claims on the basis of an attribute-based access control (ABAC) policy.

BACKGROUND OF THE INVENTION

An ABAC policy defines access control permissions based on the attributes of the subject, of the resource, and of the action that the subject wants to perform on the resource (e.g., read, write). A resource may be, inter alia, a portion of a personal storage quota, a business unit storage quota, an information retrieval system, a (portion of a) database, an online service, a protected webpage or a physical device.

There currently exist general-purpose AC languages that have the richness to express fine-grained conditions and conditions which depend on external data. One particular example of an AC language is the eXtensible Access Control Markup Language (XACML) which is the subject of standardization work in a Technical Committee of the Organization for the Advancement of Structured Information Standards (see http://www.oasis-open.org). A policy encoded with XACML consists of functional expressions in attribute values, and the return value (decision) of the policy is one of Permit, Deny, Not Applicable, or Indeterminate. An XACML policy can apply to many different situations, that is, different subjects, resources, actions and environments and may give different results for them. The XACML specification defines how such a request is evaluated against the policy, particularly what policy attributes are to be evaluated or, at least, which values are required to exist for a successful evaluation to result. Key characteristics of this evaluation process are that the request (the query against the policy) must describe the attempted access to a protected resource fully. In practice, it may be that the request is constructed in multiple stages by different components, so that a PEP (Policy Enforcement Point) provides only some initial attribute values and a PDP (Policy Decision Point) or other components can dynamically fetch more values from remote sources as they are needed.

XACML-based solutions typically introduce "authorization as a service" whereby a Policy Enforcement Point (PEP) within a target application/system captures access requests in real time and sends them to a Policy Decision Point (PDP) for evaluation against one or more XACML policies. In practice, however, many organizations operate systems for which there are currently no PEP components available, and whose authorization mechanisms are built around other models than ABAC.

As one example of such non-ABAC models, the Security Assertion Markup Language (SAML), which is also standardized within OASIS, provides an XML-based framework for creating and exchanging security information between online parties, such as user authentication, entitlement and attribute information, to facilitate federated security scenarios. Windows Identity Foundation (WIF), available from Microsoft Corp. of Redmond, Wash., is a platform tool having SAML support and being designed for building claims-based applications and services.

In the SAML framework, the concept of claims or authorization claims was introduced as a more flexible, granular artifact for authorization than the roles in role-based authorization security. One purpose of a claim is to assert the identity of the authenticated user and the user's access rights. While carrying the same claim, a user may experience different access rights depending on the resource solicited, values of environment variables (e.g., time of day and geographic coordinates) and any changes made by the system administrators in the various systems the user interacts with. A claim reflects an assertion about a property of an entity (whether subject or resource) whose validity can be contested and eventually verified by relying on some common source of trust. A claim may be encoded in metadata in a distributed fashion, such as by annotating, on the one hand, user profiles with the authorization claims they carry and, on the other hand, resource profiles with the claims which are to cause them to permit access. This is an example of such distributed encoding:

User1
claimA, claimB
User2
claimA
File1
read: claimA, claimB
write: claimA
delete: -
Folder2 and files in Folder 2
read: claimB
write: claimB
delete: claimB Distributed encoding may have advantages since enforcement typically happens at resource level, whereas it may be desirable to modify permissions both in a user-oriented and a resource-oriented fashion. Considering the totality of authorization data present in a computer system at a given time, however, each nonempty claim gives rise to what may be referred to as a privilege relation associating at least one user identity, at least one resource identity and optionally environment and/or action data. The privilege relation is an abstract entity, which may not necessarily be encoded as such in the computer system but may be derived on the basis of metadata pertaining to those objects (resources), user profiles etc. in which a given claim is present. Continuing the previous example:

Privilege relation of ClaimA
carried by users: User1, User2
carried by objects: File1
effects: read or write File1
Privilege relation of ClaimB
carried by users: User1
carried by objects: File1, Folder2
effects: read File1, read or write or delete Folder2

Applications are typically more flexible if authorization is not tied to a fixed set of roles. Role-based authorization, as introduced above, works smoothly in an application that will always rely on a specific set of roles to authorize access and in which those roles will always carry the same meaning in terms of access rights to features and functionality. However, the meaning of roles often varies across different user groups of an application and thus require customization. That might mean evaluating roles differently depending on the user's domain, or allowing custom roles to be created to control access rights. A claims-based security model allows roles to be decoupled from the authorization mechanism, so that logical roles can be mapped to a more granular set of claims, and the application authorizes access based on those claims. If modified or new roles warrant a different set of claims to be issued, the application is not affected. Deepened information on claims-based authorization may be obtained from US 2010/299738 A1.

In computer system where the hardware, operating system and applications support claim-based or role-based authorization, it may still be desirable to define, enter and/or maintain users' access rights in ABAC policy form. In this situation, frequent conversions from ABAC policy form into claim-based or role-based form are to be expected. It has proven to be a challenging problem to perform these conversions in a computationally efficient manner.

SUMMARY OF THE INVENTION

It is an object of the present invention to provide methods and devices, improved from the point of view of computational complexity, for provisioning user access rights equivalent to an ABAC policy in a form suitable for access-control systems oriented towards a different authorization model. It is a particular object to provide such methods and devices for provisioning user access rights represented as authorization claims to be encoded in a distributed fashion.

As used in this disclosure,
categories include subjects and resources; optional further categories are actions and environments; each element belongs to exactly one category; and
an attribute is a characteristic of an element which may be referenced in expressions, particularly predicates, conditions and rules, within a policy.

In an example situation, the users of a computer system may be said to correspond to elements in the category of subjects. Similarly, the objects (e.g., files, folders etc. in a file system or physical or virtual resources) may correspond to elements in the category of resources.

The inventors have realized that the structure of an ABAC policy can be utilized in order to reduce the number of numerical operations that are necessary for provisioning a set of authorization claims equivalent to the ABAC policy. These insights form the basis for the methods and devices defined in the independent claims. The dependent claims define advantageous embodiments.

In a first aspect, the invention provides a method including evaluations of an ABAC policy which includes attributes pertaining to at least two categories, e.g., subjects and resources. The method will be briefly discussed in what follows, partially in terms of mathematical formulae which are intended to add another angle to the presentation and not to limit the scope of the invention to a literal interpretation of the formulae. For instance, the method is equally applicable to a situation where a different number of attribute categories than three is present.

For the purpose of an example, let $\{x_i:i \in I\}$, $\{y_j:j \in J\}$, $\{z_k:k \in K\}$ be sets of elements belonging respectively to three different categories, where I,J,K are respective index sets. The elements in the first category carry values of attributes pertaining to the first category, the second-category elements carry second-category attribute values and so forth. Let P be an ABAC policy which maps the attribute values carried by a triple (x, y, z) of elements to an access decision d, which is one of Permit and possibly further decisions, which access decision is enforced to control access in a computer system. Letting A be an attribute value extraction operator, which outputs the attribute values of the input elements x, y, z, this relationship may be expressed as d=P(A(x,y,z)) or more simplified as d=P(x,y,z).

The first category is selected as primary category, and the ABAC policy is evaluated partially for all elements $\{x_i:i \in I\}$ in the primary category. The selection of the primary category can be arbitrary (implemented as random selection or deterministic, non-dynamic selection) or follow some heuristics. The output from this process is a sequence of primary simplified policies $$P_{x_i}(y,z):=P|_{x=x_i}(y,z), i \in I.$$

Let $x_i \sim x_{i'}$ if and only if $\widetilde{P_{x_i}} = \widetilde{P_{x_{i'}}}$, where $\tilde{P}$ denotes the normal form of ABAC policy P. A policy, when regarded as a logical formula, may be rewritten, using per se known methods, on disjunctive normal form (DNF), conjunctive normal form (CNF) or any other canonical representation. The equivalence relation ~ gives rise to a partition I/~ of the index set associated with the first category. Accordingly, the elements $x_i$, $i \in I$ in the primary category are partitioned into one or more primary equivalence classes $X_1, X_2, X_3, \ldots$ with the property that any two elements in the same primary equivalence class give rise to simplified policies that are equal on normal form. In other words, each policy arising from the partial evaluations that is unique when written on normal form justifies a further primary equivalence class to be defined, hence the number of equivalence classes $N_x \leq \text{Card } I$. It is understood that policies which turn out to be equal on normal form are necessarily equivalent—in the sense that they provide identical access decisions in respect to identical sets of attribute values—regardless of the form on which they may be represented. Further, the operation of rewriting a policy may correspond, in the context of automatic data processing, to modifying a data record representing the policy from one format to another and/or from a first representation in a given format to a different representation, equivalent to the first representation, in the same format. A representation of an ABAC policy may comprise a set of computer-readable instructions, such as a set of logical rules.

In the running example, the third category is identified as final category. Again, there may be different possible ways of selecting the final category, including arbitrary selection. By partial evaluation, the method forms simplified policies $$P_{p,j}(z):=P|_{(x,y)=(x_p,y_j)}(z), 1 \leq p \leq N_X, j \in J,$$

where $x_p$ is an element in equivalence class $X_p$, as may be achieved by renumbering (permutation of the index set I). Because $y_j$ is an element not belonging to the final (third) category, it is noted that $(x_p,y_j)$ is a vector of an element from an equivalence class and an element in a non-final category. For each simplified policy thus obtained, the method finds (the index set of) those third-category elements for which the policy evaluates to Permit, namely $$K_{p,j}:=\{k \in K: P_{p,j}(z_k)=\text{Permit}\}, 1 \leq p \leq N_X, j \in J.$$

It is noted that partial evaluation against the second category is not an essential feature but may be carried out optionally, as further detailed below. The partial evaluation may be repeated for a further vector of an element from an equivalence class and an element in a non-final category until all possible vectors have been exhausted.

Based on the sets $K_{p,j}$ thus obtained, the method defines an authorization claim in a privilege relation associating the elements in the primary equivalence class $X_p$, the secondary-category element $y_j$ and the set of third-category elements $\{z_k: k \in K_{p,j}\}$. With respect to each category separately, the authorization claim may be expressed in terms of the identities of the elements in this category or in terms of their attribute values. The authorization claim may be encoded as one data record or may, as noted above, be encoded in a distributed fashion as a plurality of data records, which are to be stored at different locations in the computer system in whatever manner is convenient for their enforcement, or as annotations (metadata) associated with other objects (resources) in the computer system. In the latter case, the authorization claim may be associated with an identity (i.e., a name or symbol being a number, string or other data identifying the authorization claim uniquely) so as to establish a relationship between annotations in different profiles, e.g., a user profile and an object profile, wherein the user possesses certain access rights in respect of the object (resource).

While the method according to the invention includes partitioning the elements in one category into equivalence classes $X_1, X_2, \ldots$, a variation of this method may without departing from the scope of the invention include partitioning elements belonging to some other group, independently of the categories to which they belong. A group may also be formed of pairs or n-tuples of elements belonging to n different categories and hence carrying attributes from all n categories. For instance, it may be natural to reflect the "permission level" artifact in some available applications by sets of attribute values from both the action and the environment category in XACML. This may also lead to more efficient annotation in the computer system, e.g., by a reduced number of duplications. As used herein, a permission level may be a group of one or more actions that may be performed with regard to an object (resource). E.g., a first permission level may be the right to read the object; a second permission level may be the right to read, edit and delete the object.

The method according to the invention reduces computational complexity in comparison with a straightforward implementation in which the full policy is evaluated for each combination of elements. The method also produces results having a structure that is likely to place minimal computational load on the system enforcing the authorization claims, which may translate to lower latency in the front end interface. Indeed, for each combination of secondary- and third-category elements, one single authorization claim is obtained. If these categories are chosen to correspond to combinations of objects (resources) and permission levels, then the deployment of the privilege relations including the authorization claims is limited to one annotation for each permission level in a given object.

Partial evaluation of the ABAC policy may for instance proceed as described in full detail in the applicant's application PCT/EP2011/069691 and further explained in a subsequent section of this application. In particular, the partial evaluation steps may comprise constructing a partial request including values of the attributes of the element(s) for which the partial evaluation is to be performed but allowing the remaining attributes to vary or to be absent or undefined.

The above has been described with reference to positive authorization rules, and accordingly, the users, objects (resources) and permission levels associated together by a privilege relation correspond to combinations for which the ABAC policy evaluates to Permit. It is understood that the present invention can be applied, after straightforward adaptation, to provision authorization based on negatively stated rules, which will then indicate forbidden combinations that are to be denied access to the requested resource. As the skilled person realises, the previously defined sets $K_{p,j}$ are then to be replaced by sets $$K_{p,j}^{Deny} := \{k \in K : P_{p,j}(z_k) = \text{Deny}\}, 1 \leq p \leq N_X, j \in J,$$

while the rest of the process is analogous to what has been described above.

In an example embodiment, the method described above can be extended by defining combined equivalence classes relating to two, three or more categories. The elements in such combined equivalence classes are pairs, triples or n-tuples (n≥4) of elements. To this end, the method repeats the steps of selecting a further ('secondary') category, evaluating the ABAC policy partially for all elements in the secondary category so as to obtain a plurality of secondary simplified policies. This will result in a corresponding partition of the elements in the secondary category into secondary equivalence classes $Y_1, Y_2, \ldots Y_{N_Y}$. Hence, the method evaluates the ABAC policy P partially to obtain secondary simplified policies $$P_{y_j}(x,z) := P|_{y=y_j}(x,z), j \in J.$$

Based on the secondary simplified policies and the equivalence relation ~defined above, the elements in the secondary category $\{y_j: j \in J\}$ are partitioned into equivalence classes $Y_1, Y_2, \ldots Y_{N_Y}$. Then, combined equivalence classes can be defined as Cartesian products $$W_{p,q} := \{(x,y) : x \in X_p, y \in Y_q\}, 1 \leq p \leq N_X, 1 \leq q \leq N_Y.$$

The skilled person will understand how this expression can be generalized in an obvious manner to a situation where tertiary or higher equivalence classes have been defined. In the last portion of the method, then, simplified policies associated with these combined equivalence classes are used, namely $$P_{p,q}(z) := P|_{(x,y)=(x_p,y_q)}(z), 1 \leq p \leq N_X, 1 \leq q \leq N_Y,$$

where $(x_p, y_q) \in W_{p,q}$. Because $N_Y \leq \text{Card } J$, the number of such simplified policies is smaller than or equal to the number of policies arising in the basic embodiment described above. Hence, the operation of finding all sets $$K_{p,q} := \{k \in K : P_{p,q}(z_k) = \text{Permit56}, 1 \leq p \leq N_X, 1 \leq q \leq N_Y$$

typically involves fewer repetitions. In other words, this step is executed with less effort. Furthermore, the authorization levels output by the method may be implemented at smaller effort since the secondary-category objects (resources) are grouped together to the greatest possible extent.

The previous extended variation of the method, which forms equivalence classes in respect of elements in more categories than a selected primary category only, can be improved from the point of view of computational performance. This may be achieved by partially evaluating the policy for each primary equivalence class, not at the moment of evaluating the policy for all elements, as previously described, but before the formation of secondary equivalence classes begins. In other words, according to some embodiments of the invention, the method initially acts on the original policy P and then, after the primary equivalence classes have been defined, goes on to analyze one or more simplified policies associated with these primary equivalence classes that have been obtained by partial evaluation. Since the processing leading up to the secondary equivalence classes is thus performed on simplified policies, which are in general simpler code objects, as outlined above, a computational saving can be expected. When the secondary equivalence classes have been formed, the evaluation can proceed with or without partial evaluation for elements representing the secondary equivalence classes.

In an example embodiment, the step of finding all final-category elements z for which the simplified policy $P_{p,j}(z)$ or $P_{p,q}(z)$ evaluates to Permit may proceed by:

translating the cached simplified policy and the given value Permit into a satisfiable logic proposition in Boolean variables ($v_i$, i=1, 2, . . . );

deriving all variable assignments ($c_j=[v_1=x_{j1}, v_2=x_{j2}, \ldots ]$) j=1, 2, . . . ) satisfying the logic proposition; and extracting, based on the variable assignments thus derived, all final-category elements (or attribute values of these) for which the ABAC policy evaluates to Permit.

The third step may involve use of a SAT solver. Alternatively, one may resort to techniques based on the theory of binary decision diagrams (BDD). This is discussed in further detail in the applicant's application PCT/SE2011/050955, which is incorporated herein by reference.

In an example embodiment, the objects (resources) can be annotated by authorization claims. Preferably, each object accepts annotation that is refined insofar as it refers to a specific one of the permission levels available for the concerned object. In this embodiment, further, the objects are ordered hierarchically (e.g., in accordance with a tree structure) so that a given object may have children and/or parents. The computer system is so configured that a child object (subordinate object) inherits those properties that follow by the annotation (metadata) carried by its parent objects, grandparent objects etc. (superordinate objects), unless the child object itself has been annotated in respect of this property, in which case the annotation in the child object takes precedence. In this example embodiment, the inheritance applies to the authorization claims, so that the system will enforce access rights accordingly.

In a further development of the preceding example embodiment, there is provided an authorization claim distribution interface which optimizes the metadata with which the objects in the computer system are annotated. The metadata optimization may have as a general aim to reduce computational load, energy consumption and/or latency in the computer system. More particularly, the optimization may include utilizing the inheritance mechanism to the greatest possible extent. To this end, the authorization claim distribution interface may be configured to identify a group of objects hierarchically related by a direct line of descent and removing an authorization claim from a child object in the group if the access effect would have followed anyway by inheritance (that is, if the child object had not carried the authorization claim that is to be deleted).

The metadata optimization may be made more powerful by including a pre-annotation capability, according to which a parent object is annotated with the concerned authorization claim, so that its child objects need not carry this authorization claim. The parent object may be one which is subject to access control itself. In this situation, the metadata optimization preferably verifies that the pre-annotation does not violate the ABAC policy forming the basis of the provisioning. Alternatively, if the parent object is not subject to access control (e.g., a nonrestricted folder in a file system), the pre-annotation may proceed without such preliminary verification against the underlying ABAC policy.

Pre-annotation of an object may be practised also in the case where all subordinate objects share the same access rights. Indeed, the pre-annotation (and removal of annotations in the child objects) may be accompanied by re-annotating those subordinate objects for which differing access rights apply and for which exceptions should be made during access control enforcement. If the optimization causes a total decrease in the number of annotations (the pre-annotation of a parent object plus any exceptions in its subordinate objects), the optimization is still likely to improve the performance of the computer system. As an alternative to this, the computer system may recognize annotation to the effect that a particular object is not to inherit any authorization claim from its parents. Such non-inheritance may sometimes be preferable to annotating an object with an explicit exception.

In a second and third aspect, the invention provides a computer-program product and a policy converter for performing the method outlined above. The computer program and policy converter generally share the advantages and potential for further developments with the first aspect of the invention.

It is noted that the invention relates to all combinations of features, even if these are recited in mutually different claims.

BRIEF DESCRIPTION OF THE DRAWINGS

Embodiments of the present invention will now be described in more detail with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION OF EMBODIMENTS

Figure 1:
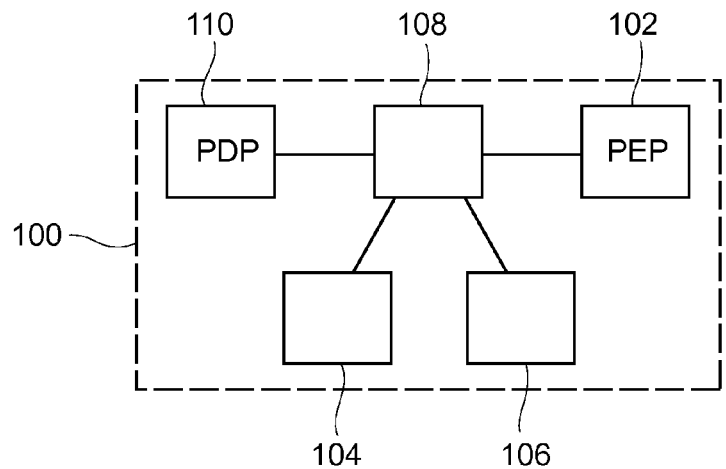
FIG. 1 illustrates an exemplifying AC policy architecture.

FIG. 1 is a generalized block diagram of the XACML architecture 100, although simplified, according to the prior art. As stated before, XACML is an access control policy language. An attempt to access a resource 102 is represented as a "Request", which lists attributes of the subject 104, the resource 102, the action and the environment 106. An attribute is an identifier, a data type and a value. It can also be described as a variable with a name (the identifier), a data type and a value. Most facts relating to the subject 104, the resource 102, the action and the environment 106 can be described in terms of attributes.

The request is constructed by a PEP 108. The purpose of a PEP 108 is to guard access to a resource 102 and only let authorized users through. The PEP 108 itself does not know who is authorized, but it submits the request to a PDP 110, which contain policies governing what requests are to be permitted or denied, respectively. The PDP 110 evaluates the policies and returns a permit/deny response to the PEP 108. The PEP 108 then either lets the access proceed or stops it.

As already noted, the PEP (Policy Enforcement Point) may provide only some initial attribute values and the PDP (Policy Decision Point) or other components may dynamically fetch more values from remote sources as they are needed. If all necessary values cannot be retrieved, the policy evaluation may return an output to the effect that the policy is indeterminate or not applicable in the circumstances, or an error message.

A purpose of this architecture is to establish separation of concerns, that is, to differentiate between policy decision making and policy enforcement. Enforcement is by its nature specific to a particular resource 102, while a decision engine can be made general purpose and reusable.

Figure 2:
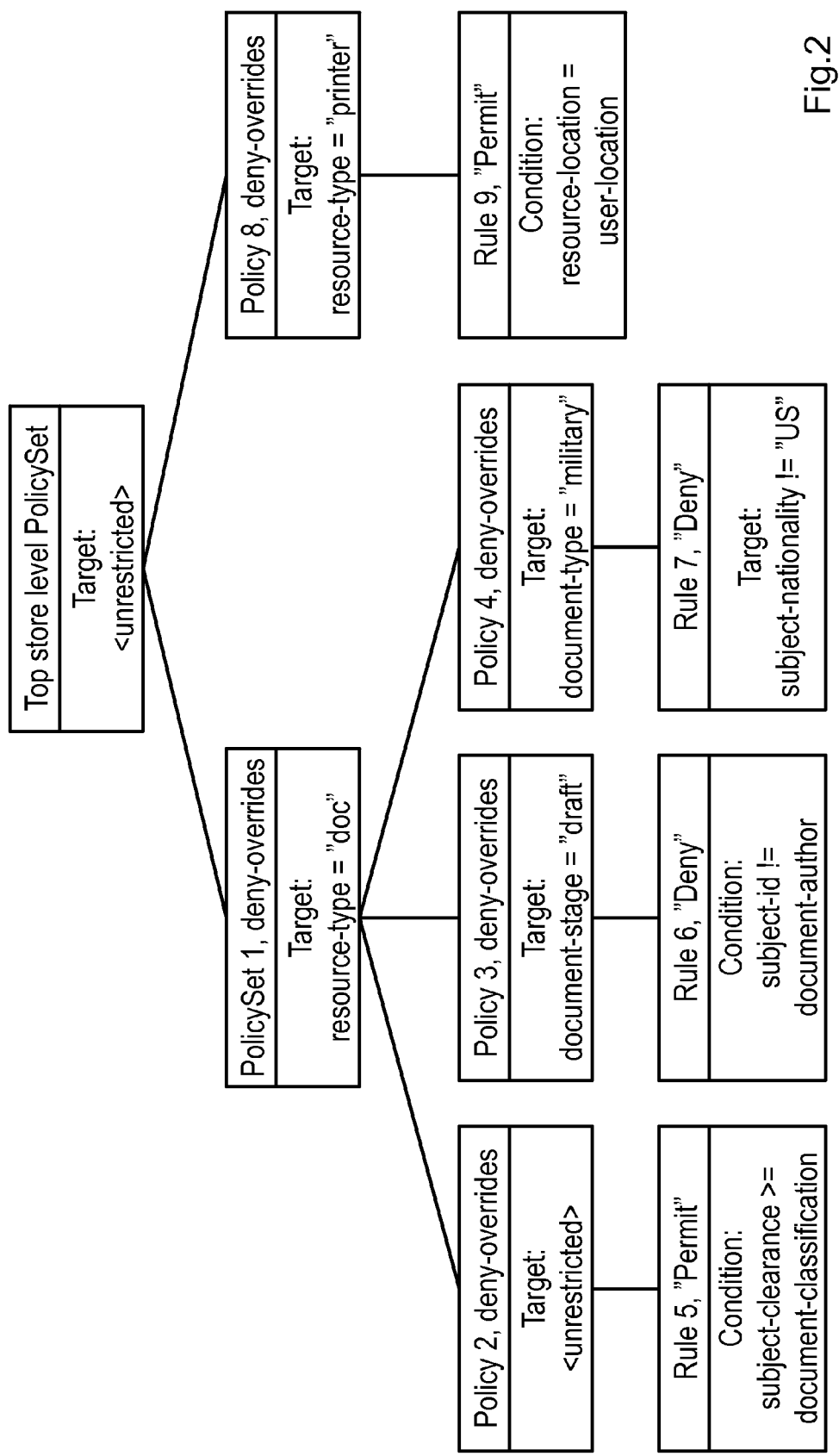
FIG. 2 is a tree representation of an AC policy set.

In general, policies can be nested to form a policy set, which may be visualized in a tree form of the type shown in FIG. 2. The combination of different policies is governed by combining algorithms, which define what policy takes precedence over another policy. The node "PolicySet 1" in FIG. 2 is of the "deny-overrides" type, so that a "Deny" decision from one of the three sub-trees will take precedence. Alternatively, sub-trees may also connect at a "permit-overrides" node. At the lowest level of the tree shown in FIG. 2, there are rules including effects (e.g., "Deny") and underlying conditions formulated in terms of attributes, for instance, "subject-nationality !='US'", where "subject-nationality" is a subject attribute and "US" is a constant.

Figure 3:
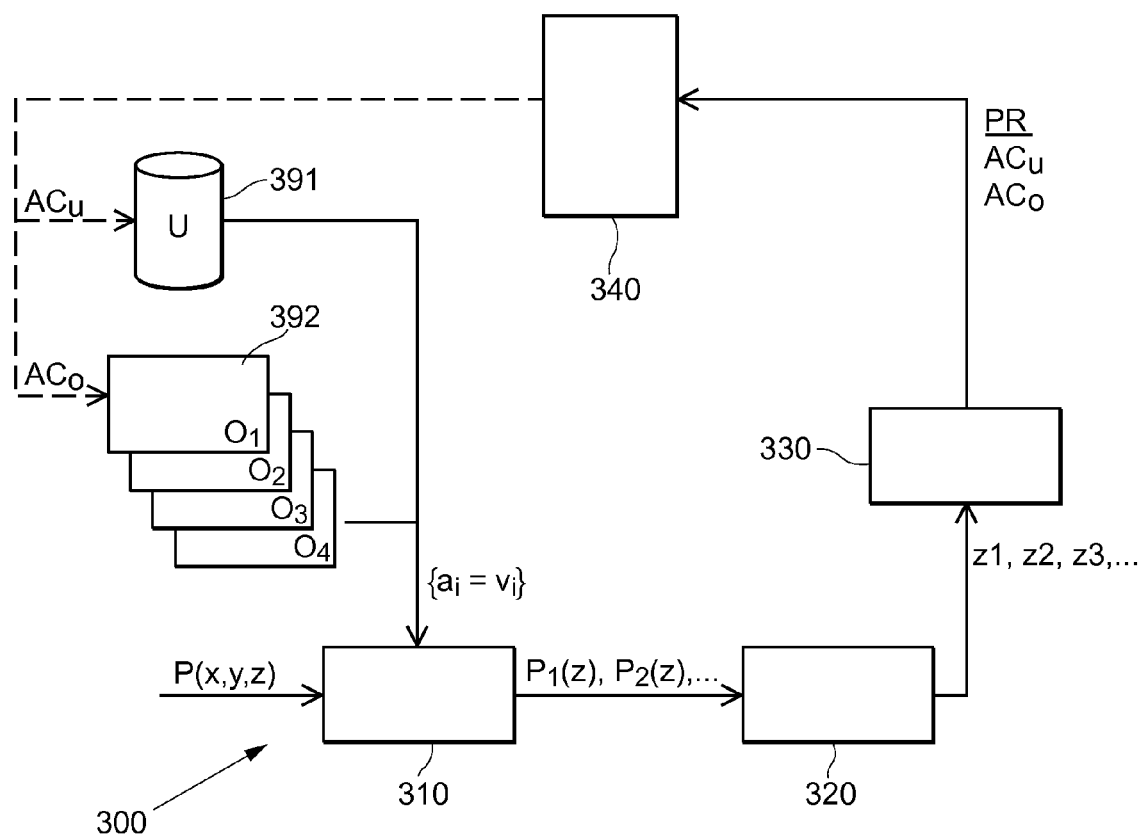
FIG. 3 shows a computer system, in which users and objects (resources) are being annotated with authorization claims in accordance with an underlying ABAC policy.

FIG. 3 shows a computer system 300, in which a user profile data base 391 stores a plurality of user profiles including metadata fields for encoding authorization claims. In the system 300, a plurality of objects 392 are endowed with other metadata fields accepting authorization claims data. As will be explained below, each object may be annotated with an authorization claim on one of a plurality of predefined permission levels. During operation of the system 300, the authorization claims are enforced in the sense that a user's access to an object (treated as a resource) is permitted only if the user shares at least one authorization claim with the object on a permission level corresponding to the requested access type.

A pre-existing ABAC policy P is to be converted into an equivalent set of authorization claims in the computer system 300. To this end, according to an example embodiment of the invention, a policy processor 310 receives the ABAC policy P and a set of attribute values $\{a_i = v_i, i=1, 2, 3, \ldots\}$ carried by the objects and users in the system 300, where $a_i$ denotes an attribute and $v_i$ a value of the attribute. The policy processor 310 selects a primary category and partially evaluates the ABAC policy P for all objects (resources, primary category), whereby it obtains and internally caches a plurality of primary simplified ABAC policies. It then converts the primary simplified policies to disjunctive normal form, which allows a canonical representation in the computer system 300 with the property that two equivalent policies will coincide in the canonical representation. (As already noted, this is not the only possible canonical representation; alternatively, conjunctive normal form may be used throughout.) By assessing equality among the primary simplified policies when represented on disjunctive normal form, the policy processor 310 forms primary equivalence classes containing groups of elements in the primary category. All elements in each equivalence class give rise, upon partial evaluation followed by conversion to disjunctive normal form, to policies that are equal. After this, the policy processor 310 forms a vector comprising one permission level (set of one or more actions, which are elements in a non-final category) and one object, and partially evaluates the policy P for the vector. The result of this operation is a simplified policy that depends on the user (an element in the final category) only. By repeating the operation for further vectors of the same type, the policy processor 310 obtains a sequence of simplified policies P1(z), P2 (z), P3 (z), . . . , where z is a variable representing (attributes values of) a user, which is supplied to a reverse policy evaluator 320. The reverse policy evaluator 320 is configured to determine all users z1, z2, z3, for which each of the simplified policies evaluates to Permit. Data representing the respective users resulting from the processing by the reverse policy evaluator 320 for each of the simplified policies are forwarded to an authorization claim generator 330. The authorization claim generator 330 defines an authorization claim, the users which are to carry the authorization claim and permission levels within each concerned object that is to be annotated with the authorization claim. Conceptually, the users, objects (resources) and permission levels form a privilege relation.

It is emphasized that the division of tasks between functional units suggested in the above example does not necessarily correspond to the division into physical units or modules distinguishable in the program code or in the computer memory during execution. For instance, it is advantageous though not strictly speaking necessary to distribute the tasks of the policy processor 310 and the policy evaluator 320 to several independent modules. Alternatively, a multi-purpose module may be provided that is responsible for both the partial evaluations, conversions into normal form, formation of equivalence classes, reverse evaluation etc. providing the authorization claim generator 330 with information sufficient to define a new authorization claim.

The way in which the authorization claims of a privilege relation are deployed in the computer system 300 is not an essential part of the present invention. In this example embodiment, there is provided an authorization claim distribution interface 340, which annotates objects 392, on appropriate permission levels, with an object format version $AC_O$ of the authorization claim defined by the authorization claim generator 330. Further, the authorization claim distribution interface 340 annotates the concerned user profiles in the user profile database 391 with the authorization claim $AC_U$ in user format. Alternatively, the authorization claim distribution interface 340 may be configured to provide the user profile database 391 with a user list for each authorization claim; the user list then forms the basis for permitting or denying access when the authorization claim is enforced during operation of the computer system 300.

Figure 4:
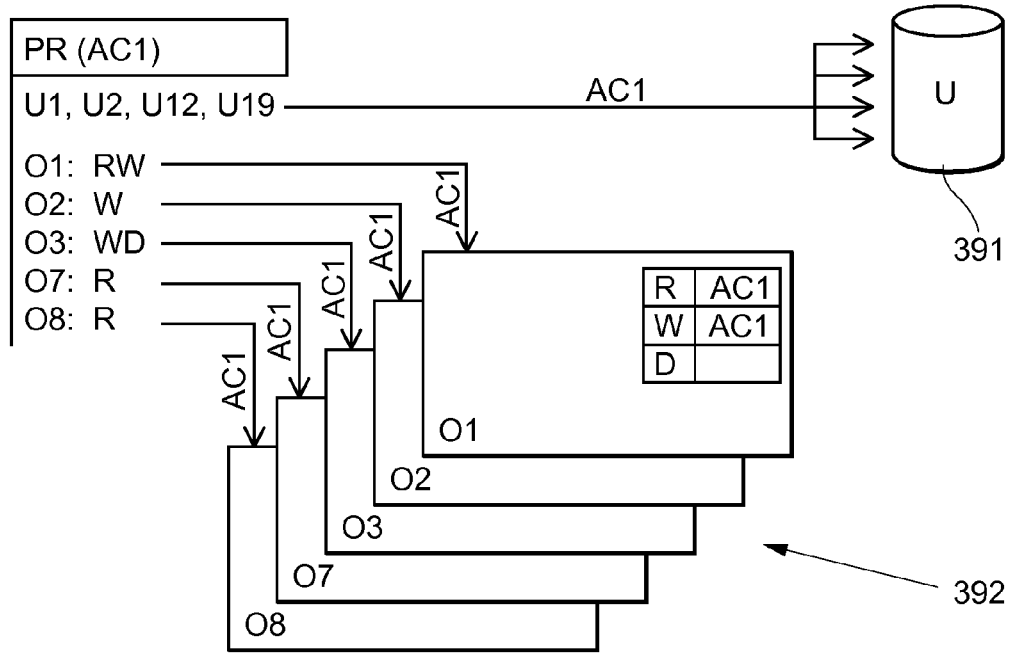
FIG. 4 clarifies a possible implementation of an aspect of the process shown in FIG. 3.

An annotation process that is possibly performed by the authorization claim distribution interface 340 is shown in greater detail in FIG. 4. A privilege relation PR(AC1) comprising authorization claim AC1 is shown symbolically in the top left corner of the figure. It is again emphasized that the privilege relation is purely conceptual and need not be represented or stored anywhere in the computer system 300. The identity of the authorization claim AC1 is inserted into user profiles U1, U2, U12, U19 in the user profile database 391. The identity of the same authorization claim AC1, suitably formatted, is also forwarded to objects O1 (on permission levels R and W), O2 (on permission level W), O3 (on permission levels W and D) as well as O7 and O8 (both on permission level R). As the drawings suggests, each object has one metadata field for receiving authorization claims pertaining to each permission level. In the example, permission levels R (action: read), W (action: write) and D (action: delete) are predefined. Without departing from the scope of the invention, the computer system 300 may provide for permission levels pertaining to combinations of actions, as has been discussed in a previous section of this disclosure.

Figure 5:
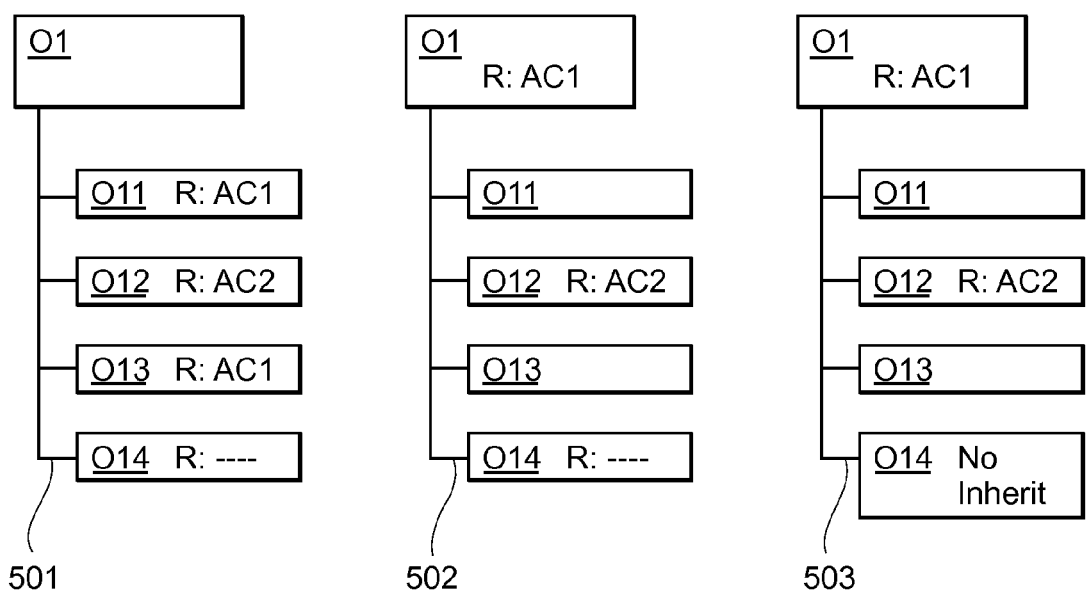
FIG. 5 illustrates a set of hierarchically ordered objects, these objects being annotated in metadata with authorization claims in accordance with four different approaches that are equivalent in terms of the rights resulting when the authorization claims are enforced.

FIG. 5 shows a set of five hierarchically ordered objects, O1 being a parent object and each of O11, O12, O13, O14 being a child object of O1. The figure shows three annotation configurations 501, 502, 503 which, by virtue of hierarchical inheritance, produce an equivalent effect in terms of access control. The first configuration 501 corresponds to a straight-forward annotation in accordance with a basic example embodiment of the invention. Here, objects O11 and O13 are annotated with AC1 on permission level R, object O12 is annotated with AC2 on permission level R and O14 carries an explicit indication that no authorization claim has been assigned for permission level R. The parent object O1 has not been annotated at all. In total, there are four annotation entries.

In the second annotation configuration 502, the parent object is annotated (pre-annotated) with that authorization claim which is carried by the largest number of its child objects, namely AC1. By inheritance, it is no longer necessary to annotate O11 and O13 with AC1, and these annotation entries may be removed. However, this configuration 502 maintains AC2 and the explicit indication of no authorization claim has been assigned to O14, absent which the enforcement of the authorization claims would have provided a different, non-equivalent access control effect. The total number of annotation entries is three, which represents a saving.

The third annotation configuration 503 differs from the second annotation configuration 502 insofar as the indication in the metadata of object O14, to the effect that no authorization claim has been assigned, has been replaced by an indication "No Inherit", exempting object O14 from the inheritance mechanism in the computer system 300. In the example shown in FIG. 5, this will lead to a total of three annotation entries, as in the second annotation configuration 502. In other situations however, including computer systems having objects hierarchically ordered on more levels than two, the option of exempting objects from inheritance may lead to more economical encoding of authorization claims than defining explicit exceptions for the same objects.

The transformation from an annotation configuration not relying on inheritance, such as annotation configuration 501, to an annotation configuration for which inheritance is used to reduce the total number of annotation entries, such as annotation configurations 502 and 503, may proceed by way of one of the per se known algorithms for this purpose. Such algorithms may include algorithms traversing the hierarchically ordered objects in a bottom-up or top-down fashion and replacing one or more annotation entries in subordinate objects by an annotation in a superordinate object thereof. In example embodiments of the invention, such algorithms are applied before, during or after annotation of the objects in order to reduce the total number of annotation entries.

Partial evaluation of the ABAC policy may for instance proceed as described in full detail in the applicant's application PCT/EP2011/069691, which is hereby incorporated by reference. As such, the partial evaluation for a set of attributes may comprise the substeps of:

with the aid of a partial request generation means constructing a partial request from said the set of attributes via a policy information means;
sending said partial request to a partial evaluation means;
with the aid of a first storing means, storing all policies for all sets of attributes;

performing partial evaluation against the policy stored in said first storing means, resulting in a simplified policy; and
with the aid of a second storing means, storing said simplified policy.

Alternatively, the partial evaluation may proceed as follows:

inputting a full ABAC policy comprising a plurality of attribute-dependent expressions, wherein each expression is evaluable to one of Not applicable, Indeterminate and either Permit or Deny;
inputting a partial request comprising at least one attribute value and at least one attribute identified as variable;
partially evaluating said full ABAC policy by substituting said at least one attribute value for a corresponding attribute appearing in the policy, and forming, based on the evaluation result and predetermined simplification rules, a simplified ABAC policy equivalent to the full ABAC policy, wherein said simplified ABAC policy comprises an expression having a result data field for storing said evaluation result.

In this connection, the result data field comprises a condition result field, operable to store at least a Permit or Deny result from the evaluation of the expression itself, and/or a target result field, operable to store at least a Not applicable result from the evaluation of the expression itself. The result data field may comprise an argument data field operable to store a result from the evaluation of an expression which is subordinate to the expression itself.

With continued reference to the partial-evaluation process, the predetermined simplification rules may be one of the following:

i) a rule stipulating that an expression evaluable to only Indeterminate is formed in the simplified ABAC policy for each expression in the full ABAC policy which evaluates under the partial request to Indeterminate and which is connected by a deny-overrides combining algorithm to at least one expression that is evaluable to Permit and not completely evaluable under the partial request, wherein the value Indeterminate is stored in the result data field;

ii) a rule stipulating that an expression evaluable to only Indeterminate is formed in the simplified ABAC policy for each expression in the full ABAC policy which evaluates under the partial request to Indeterminate and which is connected by a permit-overrides combining algorithm to at least one expression that is evaluable to Deny and not completely evaluable under the partial request, wherein the value Indeterminate is stored in the result data field;

iii) a rule stipulating that an expression evaluable only to False is formed in the simplified ABAC policy for each expression in the full ABAC policy which evaluates under the partial request to False and which is connected by a Boolean AND function to at least one expression that is not completely evaluable under the partial request, wherein the value False is stored in the result data field;

iv) a rule stipulating that one expression evaluable only to Indeterminate is formed in the simplified ABAC policy if there is at least one expression in the full ABAC policy which evaluates under the partial request to Indeterminate and which is connected by a target-type combining algorithm to at least one expression that is not completely evaluable under the partial request, wherein the value Indeterminate is stored in the result data field.

It is presently contemplated to apply the invention to systems which use authorization claims for their access control and in which, preferably, the resources are organized hierarchically. One example of such systems is Microsoft SharePoint, a web application platform that may be used in web content management, document management systems but also a wider range of applications.

Further embodiments of the present invention will become apparent to a person skilled in the art after studying the description above. Even though the present description and drawings disclose embodiments and examples, the invention is not restricted to these specific examples. For instance, the invention can be applied to control access to resources (objects) outside the context of computing; as an example, access to the premises in a building can be controlled if suitable identification means (e.g., card readers, biometric sensors, which identify a person as a subject in a guarding system) and actuators (e.g., electrically controllable door locks) are provided and are communicatively connected to a computer system for enforcing the AC policy. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A computer-implemented method of provisioning authorization claims, which are enforced to control access of users to objects in a computer system,
   each authorization claim forming part of a privilege relation associating at least one user, at least one object and at least one permission level,
   the method comprising the steps:
   i) receiving, by a policy processor, an attribute-based access control (ABAC) policy depending on attributes and evaluable to one of Permit and possible further values;
   ii) receiving, by the policy processor, attribute values for a plurality of elements in predefined categories corresponding to users, objects and permission levels in the computer system;
   viii) selecting, by the policy processor, one of the predefined categories as a final category and, for a vector comprising one element from each of any remaining non-final category, finding all elements in the final category for which the ABAC policy evaluates to Permit; and
   ix) defining, by an authorization claim generator, an authorization claim and a privilege relation in which the authorization claim associates said one element from each remaining non-final category and the elements in the final category thus found.

2. The method of claim 1, wherein step viii is preceded by:
   iii) selecting one of the predefined categories as a primary category and, for each of the elements in the primary category, restricting a copy of the ABAC policy to said element, whereby a plurality of primary simplified ABAC policies is obtained; and
   iv) converting the primary simplified policies to normal form, assessing equality between the converted primary simplified policies and partitioning the elements in the primary category accordingly into at least one primary equivalence class,
   wherein:
   step viii comprises restricting each primary simplified ABAC policy to the elements in a vector comprising one element from each of any remaining non-final category and further comprising one of said primary equivalence classes, to obtain a simplified ABAC policy depending only on attributes of elements in the final category, and finding all elements in the final category for which the simplified ABAC policy evaluates to Permit; and
   the authorization claim defined in step ix associates the primary equivalence class, said one element from each remaining non-final category and the elements in the final category thus found.

3. The method of claim 2, wherein step iii comprises obtaining the simplified ABAC policy by partially evaluating the ABAC policy for the vector.

4. The method of claim 2, wherein step viii is immediately preceded by the steps:
   v) selecting a secondary category and partially evaluating the ABAC policy for all elements in the secondary category, whereby a plurality of secondary ABAC policies is obtained;
   vi) converting the secondary simplified policies to normal form, assessing equality between the converted secondary simplified policies and partitioning the elements in the secondary category accordingly into at least one secondary equivalence class; and
   vii) forming combined equivalence classes as Cartesian products of all primary and secondary equivalence classes, said combined equivalence classes containing pairs of elements from the primary and secondary categories,
   wherein:
   step viii comprises using a combined equivalence class and a pair of elements therefrom in the place of the primary equivalence class and an element therefrom; and
   step ix comprises forming an authorization claim and a privilege relation in which the authorization claim associates the primary and secondary equivalence classes, from which the combined equivalence class was formed, said one element from each remaining non-final category and the elements in the final category thus found.

5. The method of claim 2, wherein step iv comprises converting the simplified policies to disjunctive normal form or conjunctive normal form.

6. The method of claim 4, wherein step vi comprises converting the simplified policies to disjunctive normal form or conjunctive normal form.

7. The method of claim 1, wherein step viii comprises the substeps:
viii-1) translating the ABAC policy and its value Permit into a satisfiable logic proposition in Boolean variables;
viii-2) deriving all variable assignments satisfying the logical proposition; and
viii-3) extracting, based on the variable assignments thus derived, all elements in the final category for which the ABAC policy evaluates to Permit.

8. The method of claim 2, wherein step viii comprises selecting a final category and, for a vector comprising one element from each remaining non-final category, partially evaluating one of said primary simplified ABAC policies resulting from step iii to obtain a simplified ABAC policy depending only on attributes of elements in the final category.

9. The method of claim 3, wherein the partial policy evaluation in step iii comprises constructing a partial request including values of the attributes of the element concerned.

10. The method of claim 1, wherein:
the objects in the computer system are annotatable with an identity of an authorization claim; and
step ix comprises the substeps:
ix-1) defining an identity of the authorization claim;
ix-2) forming a user list being a data record comprising identities of the elements, within the privilege relation, that belong to the category corresponding to users; and
ix-3) annotating the elements, within the privilege relation, that belong to the category corresponding to objects with the identity of the authorization claim thus defined.

11. The method of claim 1, wherein:
the objects are hierarchically ordered in the computer system relative to one another in the computer system; and
the computer system is configured to enforce authorization claims by inheritance, whereby subordinate objects inherit from parent objects,
the method further comprising:
x) identifying a group of objects hierarchically related by a direct line of descent and removing an authorization claim from a subordinate object in the group if the same effect as achieved by the authorization claim to be removed follows by inherited enforcement, possibly after annotating a superordinate object in the group with the concerned authorization claim.

12. The method of claim 11, wherein the objects are annotatable in respect of different permission levels separately, said computer system being configured to enforce authorization claims by inheritance for each permission level separately.

13. The method of claim 2, wherein the primary category is subjects, the final category is resources and the remaining non-final category or categories correspond(s) to permission levels.

14. A non-transitory data carrier storing computer-executable instructions for performing the method of claim 1.

15. A policy converter for provisioning authorization claims, which are enforced to control access of users to objects in a computer system, each authorization claim forming part of a privilege relation associating at least one user, at least one object and at least one permission level,
the policy converter comprising:
a memory;
a processor;
a policy processor configured to:
i) receive an attribute-based access control (ABAC) policy depending on attributes and evaluable to one of Permit and possible further values;
ii) receive attribute values for a plurality of elements in predefined categories corresponding to users, objects and permission levels in the computer system;
viii) select one of the predefined categories as a final category and, for a vector comprising one element from each of any remaining non-final category;
a reverse policy evaluator configured to find all elements in the final category for which the ABAC policy evaluates to Permit; and
an authorization claim generator configured to define an authorization claim and a privilege relation in which the authorization claim associates the primary equivalence class, said one element from each remaining non-final category and the elements in the final category found by the reverse policy evaluator.

16. The policy converter of claim 15,
wherein the authorization claim generator is configured to:
ix-1) define an identity of the authorization claim; and
ix-2) form a user list being a data record comprising identities of the elements, within the privilege relation, that belong to the category corresponding to users,
the policy converter further comprising an authorization claim distribution interface configured to annotate any element identified by the user list with the authorization claim and to annotate any elements, within the privilege relation, that belong to the category corresponding to objects with the identity of the authorization claim defined by the authorization claim generator.

* * * * *